March 14, 1933.   J. R. FAWCETT   1,901,091
FISHING REEL
Filed Sept. 30, 1931
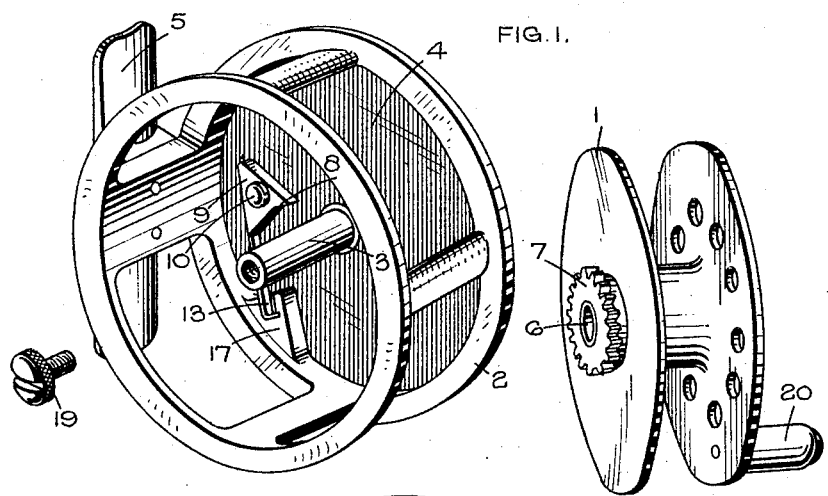
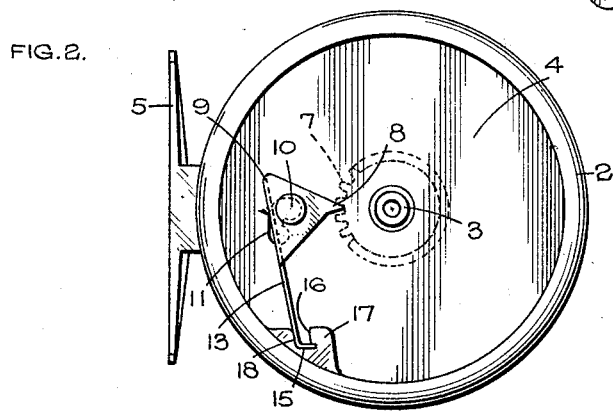
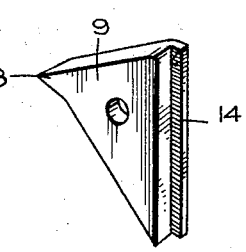
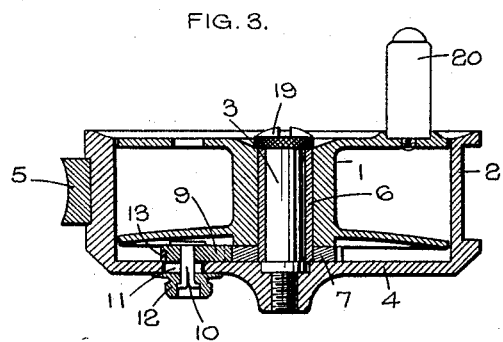
Inventor:
John R. Fawcett
by Richard E. Babcock
Attorney Patented Mar. 14, 1933

1,901,091

UNITED STATES PATENT OFFICE

JOHN REGINALD FAWCETT, OF STUDLEY, ENGLAND, ASSIGNOR TO WILLIAM HALL & COMPANY LIMITED, OF STUDLEY, ENGLAND, A COMPANY OF GREAT BRITAIN

FISHING REEL

Application filed September 30, 1931, Serial No. 566,118, and in Great Britain December 19, 1930.

This invention relates to fishing reels and refers more particularly to that kind of reel which incorporates a rotary drum or reel for the line, this drum usually having a disc at one or both sides and being mounted rotatably, generally upon a pin carried by a plate-like or other supporting structure which is adapted to be attached to the rod.

In fishing reels of the type referred to, it is a common practice to provide the said plate or supporting structure with a pivoted spring pressed pawl which is adapted to act upon the teeth of a small pinion carried by the rotary drum or reel, the pawl being designed to give resistance to rotation in both directions and usually giving a greater resistance in one direction than in the other.

In the type of reel referred to, it is a common practice to make at least one side of the pawl substantially flat and to provide a plate or wire spring acting upon this flat side such springs usually being attached to the plate by which they are carried by means of a screw or rivet.

The primary object of the present invention is to provide an improved construction of plate which will allow of the spring being assembled thereon by a simpler operation than attaching by a screw or rivet, and the invention has the further advantage that it facilitates the manufacture of fishing reels in material such as synthetic resin which requires a metal insert in every position in which it is to receive a screw or a rivet.

Referring to the drawing.

Figure 1 is a perspective view of one form of fishing reel constructed according to this invention, the figure showing the reel removed from its supporting plate and spindle.

Figure 2 is a side elevation of the reel casing or support.

Figure 3 is a sectional plan of the fishing reel shown in Figure 1.

Figure 4 is a perspective view of the pawl employed in the fishing reel illustrated in Figures 1 to 3.

Referring to the drawing, 1 is the reel proper or drum, 2 is the reel support having a plate-like part 4 carrying a pin 3 on which the reel 1 is mounted. A set screw 19 is provided for retaining the reel on the pin 3, and the reel has an operating handle 20.

The reel support 2 is provided with the usual member 5 for connecting it to the fishing rod.

The reel 1 is provided with a brass or suitable bush 6, on the inner end of which is mounted a pinion 7. This pinion is engaged normally by the apex 8 of a substantially triangular pawl 9 mounted on a pin or rivet 10 passing through an L shaped slot 11 in the back plate 4 of the reel supporting structure. At its outer end this pin is riveted into a collar 12 provided with a knurled head.

The rivet 10 is capable of movement in the slot 11 for moving the pawl into an "out of engagement" position in which the pawl is clear of the pinion 7.

The pawl is loaded or biased by means of a spring 13 formed by a length of spring metal of strip or wire form, having one end anchored to the back plate 4 of the reel supporting structure, and its opposite end resting on one side of the pawl 9, the latter having an upstanding lip 14 between which and the back plate 4 of the reel supporting structure, the outer end of the spring 13 is retained. The lip 14 prevents the sideways movement of the spring 13.

The anchored end of the spring 13 is L shaped, that is to say, the extreme end 15 is bent substantially at right angles to the main part of the spring 13. The L shaped end of the spring 13 is mounted in, and is a tight or close fit in, a substantially L shaped or undercut recess 16 in a projection, embossment or housing 17 on the plate 4. The spring end 15 is further held in the recess 16 by the pressure exerted by the spring on the side 18 of the recess due to a slight distortion of the main part of the spring 13 out of the plane of the side 18 of the said recess.

The pawl 9 offers a slightly greater resistance to the anti-clockwise rotation of the reel or drum than it does to the clockwise rotation of the drum, and this increase of resistance is due to the leverage on the spring being less when the drum rotates anti-clockwise than when it rotates clockwise.

What I claim then is:—

1. A fishing reel comprising a drum forming the reel proper, a supporting structure on which said drum is mounted rotatably, a toothed wheel associated with the drum, a pawl coacting with said toothed wheel, a lip along one side of said pawl, a blade spring acting on said pawl, one end of said spring blade being bent over to project transversely of the main portion, a housing on the supporting structure, and an internal shoulder in said housing behind which shoulder the bent over end of the spring engages the main part of said spring engaging the pawl and being enclosed between the inner wall of the supporting structure and the lip on said pawl to prevent sideways displacement of said spring.

2. A fishing reel comprising a drum forming the reel proper, a supporting structure on which said drum is mounted rotatably, a toothed wheel associated with the drum, a pawl coacting with said toothed wheel, a lip along one side of said pawl, a blade spring acting on said pawl one end of said spring being bent over to project transversely of the main portion, a housing on said supporting structure, an internal shoulder in said housing behind which shoulder the bent over end of the spring engages, the main portion of the spring engaging said pawl and being enclosed between the inner wall of the supporting structure and the lip on said pawl, to prevent sideways displacement of said spring and the spring engaging walls of said housing being at a slight angle to the normal position of said pawl so that the spring is distorted slightly when mounted in position to facilitate its retention in said housing.

3. A fishing reel comprising a drum forming the reel proper, a supporting structure on which said drum is mounted rotatably, a toothed wheel associated with the drum, a pawl coacting with said toothed wheel, a lip along one side of said pawl, a blade spring acting on said pawl, one end of said spring being bent over to project at right angles to the main portion, said main portion being mounted between said lip and the inner wall of the supporting structure to prevent sideways displacement of said spring, a housing on the supporting structure and an internal shoulder in said housing behind which shoulder the bent over end of the spring engages.

4. A fishing reel comprising a drum forming the reel proper, a supporting structure on which said drum is mounted rotatably, a toothed wheel associated with the drum, a pawl coacting with said toothed wheel, a lip along one side of said pawl, a spring acting on said pawl, one end of said spring being bent over to project transversely of the main portion, a housing integral with the supporting structure, an internal shoulder in said housing behind which shoulder the bent over end of the spring engages, the main portion of the spring engaging said pawl and being enclosed between the inner wall of the supporting structure and the lip on said pawl, to prevent sideways displacement of said spring.

5. A fishing reel comprising a drum forming the reel proper, a supporting structure on which said drum is mounted rotatably, a toothed wheel associated with the drum, a pawl coacting with said toothed wheel, a lip along one side of said pawl, a spring acting on said pawl, one end of said spring being bent over to project at right angles to the main portion, said main portion being mounted between said lip and the inner wall of the supporting structure to prevent sideways displacement of said spring, a housing integral with and projecting from the side wall of said supporting structure and an internal shoulder in said housing, behind which shoulder the bent over end of the spring engages.

In witness whereof I affix my signature.

JOHN REGINALD FAWCETT.